US011526462B2

(12) United States Patent
Lahiri et al.

(10) Patent No.: US 11,526,462 B2
(45) Date of Patent: Dec. 13, 2022

(54) ONE-SIDED RELIABLE REMOTE DIRECT MEMORY OPERATIONS

(71) Applicant: ORACLE INTERNATIONAL CORPORATION, Redwood Shores, CA (US)

(72) Inventors: Tirthankar Lahiri, Palo Alto, CA (US); Juan R. Loaiza, Woodside, CA (US); Garret F. Swart, Palo Alto, CA (US); Jesse Kamp, Castro Valley, CA (US); Avneesh Pant, Fremont, CA (US); Hideaki Kimura, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 86 days.

(21) Appl. No.: 17/071,164

(22) Filed: Oct. 15, 2020

(65) Prior Publication Data

US 2021/0026798 A1  Jan. 28, 2021

Related U.S. Application Data

(62) Division of application No. 16/055,978, filed on Aug. 6, 2018, now Pat. No. 11,347,678.

(51) Int. Cl.
*G06F 9/54* (2006.01)
*G06F 15/167* (2006.01)
(Continued)

(52) U.S. Cl.
CPC ........ *G06F 15/167* (2013.01); *G06F 9/45533* (2013.01); *G06F 9/544* (2013.01); *G06F 9/547* (2013.01); *G06F 15/17331* (2013.01)

(58) Field of Classification Search
None
See application file for complete search history.

(56) References Cited

U.S. PATENT DOCUMENTS

| 5,893,086 A | 4/1999 | Schmuck |
| 8,145,838 B1 | 3/2012 | Miller et al. |

(Continued)

FOREIGN PATENT DOCUMENTS

| WO | WO 2007/045839 A2 | 4/2007 | |
| WO | WO 2008/070173 A1 | 6/2008 | |
| WO | WO-2008070173 A1 * | 6/2008 | ............. G06F 1/183 |

OTHER PUBLICATIONS

Wikipedia, the free encyclopedia, "Cuckoo Hashing", https://en.wikipedia.org/wiki/Cuckoo_hashing, last viewed on Jul. 31, 2017, 7 pages.

(Continued)

*Primary Examiner* — Uzma Alam
(74) *Attorney, Agent, or Firm* — Hickman Becker Bingham Ledesma LLP

(57) ABSTRACT

Techniques are provided to allow more sophisticated operations to be performed remotely by machines that are not fully functional. Operations that can be performed reliably by a machine that has experienced a hardware and/or software error are referred to herein as Remote Direct Memory Operations or "RDMOs". Unlike RDMAs, which typically involve trivially simple operations such as the retrieval of a single value from the memory of a remote machine, RDMOs may be arbitrarily complex. The techniques described herein can help applications run without interruption when there are software faults or glitches on a remote system with which they interact.

18 Claims, 4 Drawing Sheets

(51) Int. Cl.
*G06F 9/455* (2018.01)
*G06F 15/173* (2006.01)

(56) References Cited

U.S. PATENT DOCUMENTS

| | | | |
|---|---|---|---|
| 8,327,186 B2* | 12/2012 | Coatney | G06F 11/2033 714/6.3 |
| 9,164,702 B1* | 10/2015 | Nesbit | G06F 3/061 |
| 9,292,564 B2 | 3/2016 | Kamp et al. | |
| 9,448,901 B1 | 9/2016 | Aslam | |
| 9,836,368 B2* | 12/2017 | Keremane | G06F 11/0757 |
| 9,977,760 B1 | 5/2018 | Diehl | |
| 10,353,734 B2* | 7/2019 | Busaba | G06F 12/0828 |
| 10,552,367 B2 | 2/2020 | Burstein et al. | |
| 10,599,435 B2 | 3/2020 | Greiner | |
| 2004/0225719 A1 | 11/2004 | Kisley et al. | |
| 2004/0268177 A1 | 12/2004 | Ji et al. | |
| 2006/0136570 A1 | 6/2006 | Pandya | |
| 2007/0239790 A1 | 10/2007 | Cattell | |
| 2007/0239797 A1 | 10/2007 | Cattell | |
| 2008/0288620 A1* | 11/2008 | Goff | G06F 3/061 709/223 |
| 2011/0137861 A1 | 6/2011 | Burnett | |
| 2012/0158729 A1 | 6/2012 | Mital | |
| 2012/0323970 A1 | 12/2012 | Larson | |
| 2012/0331243 A1 | 12/2012 | Aho | |
| 2013/0262613 A1 | 10/2013 | Hefty | |
| 2013/0275631 A1* | 10/2013 | Magro | G06F 13/14 710/28 |
| 2014/0189032 A1 | 7/2014 | Sugimoto | |
| 2014/0200166 A1 | 7/2014 | Van Rooyen | |
| 2014/0304353 A1 | 10/2014 | Evans | |
| 2014/0337593 A1 | 11/2014 | Holbrook | |
| 2015/0067088 A1 | 3/2015 | Guerin | |
| 2016/0026605 A1 | 1/2016 | Pandit | |
| 2016/0028819 A1 | 1/2016 | Schultz | |
| 2016/0124880 A1* | 5/2016 | Goren | G06F 3/067 710/263 |
| 2016/0132411 A1 | 5/2016 | Jolad et al. | |
| 2016/0147627 A1 | 5/2016 | Hass | |
| 2016/0188527 A1 | 6/2016 | Cherian | |
| 2016/0306923 A1 | 10/2016 | Van Rooyen | |
| 2017/0034270 A1* | 2/2017 | Nagasubramaniam | G06F 15/167 |
| 2017/0075856 A1 | 3/2017 | Suzue | |
| 2017/0091246 A1 | 3/2017 | Risvik | |
| 2017/0103039 A1 | 4/2017 | Shamis | |
| 2017/0109317 A1 | 4/2017 | Hack et al. | |
| 2017/0124021 A1 | 5/2017 | Brown | |
| 2017/0147507 A1 | 5/2017 | Horii | |
| 2017/0149890 A1 | 5/2017 | Shamis | |
| 2017/0149924 A1 | 5/2017 | Peterson | |
| 2017/0192863 A1* | 7/2017 | Eluri | G06F 16/27 |
| 2017/0255590 A1* | 9/2017 | Shuler | H04L 67/1097 |
| 2017/0277655 A1 | 9/2017 | Das | |
| 2017/0300592 A1 | 10/2017 | Breslow | |
| 2017/0357611 A1 | 12/2017 | Cherian | |
| 2018/0096049 A1 | 4/2018 | Kondiles | |
| 2018/0232334 A1* | 8/2018 | Oved | G06F 13/4278 |
| 2018/0316760 A1 | 11/2018 | Chernin | |
| 2018/0341596 A1 | 11/2018 | Teotia | |
| 2018/0341653 A1 | 11/2018 | Teotia | |
| 2019/0065401 A1* | 2/2019 | Dormitzer | H04L 41/0816 |
| 2019/0187916 A1 | 6/2019 | Romem | |
| 2020/0042489 A1 | 2/2020 | Lahiri | |
| 2021/0026799 A1 | 1/2021 | Lahiri et al. | |
| 2021/0049123 A1 | 2/2021 | Lahiri et al. | |

OTHER PUBLICATIONS

Wang et al., "C-Hint: An Effective and Reliable Cache Management for RDMA-Accelerated Key-Value Stores", dated 2014, 13 pages.

Tyler Szepesi, et al. "Nessie: A Decoupled, Client-Driven, Key-Value Store using RDMA", Copyright 2015 the authors CS—Sep. 2015, 13 pages.

Mitchell et al., "Using One-Sides RDMA Reads to Build a Fast, CPU-Efficient Key-Value Store", 12 pages.

Li et al., "KV-Direct: High-Performance In-Memory Key-Value Store with Programmable NIC", SOSP '17, dated Oct. 28, 2017, Shanghai, China, 16 pages.

Kalia et al., "Using RDMA Efficiently for Key-Value Services", SIGCOMM'14, Aug. 17-22 2014, Chicago, IL, USA, 15 pages.

Fan et al., "MemC3: Compact and Concurrent MemCache With Dumber Caching and Smarter Hashing", NSDI'13, dated Apr. 2013, 14 pages.

Dragojević, et al., "FaRM: Fast Remote Memory", https://www.usenix.org/conference/nsdi14/technical-sessions/dragojević, dated Apr. 2014, 15 pages.

Mellanox Technologies, "Introduction to InfiniBand", Mellanox Technologies Inc., Document No. 2003WP, https://www.mellanox.com/pdf/whitepapers/IB_Intro_WP_190.pdf, dated Sep. 2017, 20 pages.

Lahiri, U.S. Appl. No. 16/055,978, filed Aug. 6, 2018, Non-Final Rejection, dated Sep. 30, 2021.

Teotia, U.S. Appl. No. 15/606,327, filed May 26, 2017, Office Action, dated Dec. 28, 2018.

Teotia, U.S. Appl. No. 15/606,327, filed May 26, 2017, Notice of Allowance, dated Mar. 11, 2019.

Teotia, U.S. Appl. No. 15/606,322, filed May 26, 2017, Office Action, dated Oct. 21, 2019.

Teotia, U.S. Appl. No. 15/606,322, filed May 26, 2017, Office Action, dated Mar. 22, 2019.

Teotia, U.S. Appl. No. 15/606,322, filed May 26, 2017, Notice of Allowance, dated Jul. 9, 2020.

Teotia, U.S. Appl. No. 15/606,322, filed May 26, 2017, Notice of Allowance, dated Mar. 4, 2020.

Lahiri, U.S. Appl. No. 16/055,978, filed Aug. 6, 2020, Office Action, dated May 1, 2020.

Lahiri, U.S. Appl. No. 16/055,978, filed Aug. 6, 2018, Final Office Action, dated Nov. 12, 2020.

Lahiri, U.S. Appl. No. 17/071,169, filed Oct. 15, 2020, Notice of Allowance and Fees Due, dated May 23, 2022.

Lahiri, U.S. Appl. No. 17/071,174, filed Oct. 15, 2020, Notice of Allowance and Fees Due, dated Mar. 7, 2022.

Lahiri, U.S. Appl. No. 17/071,169, filed Oct. 15, 2020, Non-Final Rejection, dated Feb. 3, 2022.

Lahiri, U.S. Appl. No. 16/055,978, filed Aug. 6, 2018, Notice of Allowance and Fees Due, dated Jan. 28, 2022.

* cited by examiner

ONE-SIDED RELIABLE REMOTE DIRECT MEMORY OPERATIONS

BENEFIT CLAIM

This application claims the benefit as a Divisional of application Ser. No. 16/055,978, filed Aug. 6, 2018, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to computer systems and, more specifically, to techniques for increasing availability of remotely-accessed functionality.

BACKGROUND

One way to improve the availability of a service is to design the service in such a way that it continues to function properly even when one or more of its components fails. For example, U.S. patent application Ser. No. 15/606,322, filed May 26, 2017 (which is incorporated herein by this reference) describes techniques for enabling a requesting entity to retrieve data that is managed by a database server instance from the volatile memory of a remote server machine that is executing the database server instance without involving the database server instance in the retrieval operation.

Because the retrieval does not involve the database server instance, the retrieval operation may succeed even when the database server instance (or the host server machine itself) has stalled or become unresponsive. In addition to increasing availability, direct retrieval of data will often be faster and more efficient than retrieval of the same information through conventional interaction with the database server instance.

To retrieve "target data" specified in a database command from a remote machine without involving the remote database server instance, the requesting entity first uses Remote Direct Memory Access (RDMA) to access information about where the target data resides in the server machine. Based on such target location information, the requesting entity uses RDMA to retrieve the target data from the host server machine without involving the database server instance. The RDMA reads (data retrieval operations) issued by the requesting entity are unilateral operations and do not require CPU interruption or OS kernel involvement on the host server machine (RDBMS server).

RDMA techniques work well for operations that simply involve the retrieval of data from volatile memory of a crashed server machine. However, it is desirable to provide high availability even when the failed component is responsible for performing an operation that is more sophisticated than a mere memory access. To address this need, some systems provide a limited set of "verbs" for performing remote operations via the Network Interface Controller, such as memory accesses and atomic operations (test and set, compare and swap). These operations can complete as long as the system is powered up and the NIC has access to the host memory. However, the type of operations that they support is limited.

More sophisticated operations on data that reside in the memory of a remote machine are typically performed by making remote procedure calls (RPCs) to applications running on the remote machine. For example, a database client that desires the average of a set of numbers that is stored in a database may make an RPC to the remote database server instance that manages the database. In response to the RPC, the remote database server instance reads the set of numbers, calculates the average, and sends the average back to the database client.

In this example, if the remote database server fails, the average-computing operation fails. However, it may be possible to use RDMA to retrieve from the remote server each number in the set. Once each number in the set of numbers is retrieved by the requesting entity, the requesting entity may perform the average-computing operation. However, using RDMA to retrieve each number in the set, and then performing the calculation locally, is far less efficient than having the application on the remote server retrieve the data and perform the average-computing operation. Thus, it is desirable to expand the scope of operations that continue to be available from a remote server when the remote server is not fully functional.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
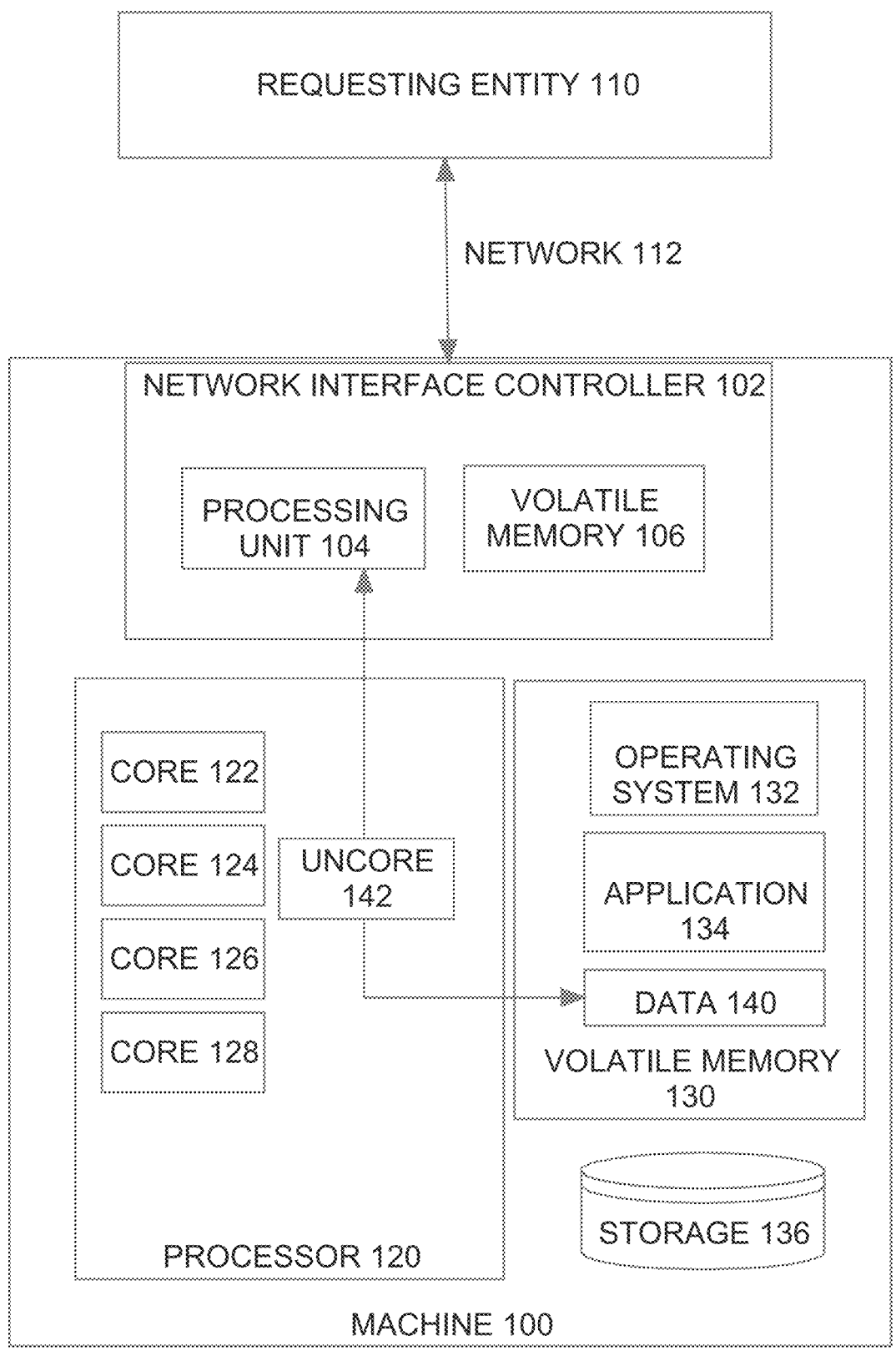
FIG. 1 is a block diagram of a requesting entity interacting with a remote machine that includes several execution candidates for a requested operation, each of which is implemented in a distinct reliability domain, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein to allow more sophisticated operations to be performed remotely by machines that are not fully functional. Operations that can be performed reliably by a machine that has experienced a hardware and/or software error are referred to herein as Remote Direct Memory Operations or "RDMOs". Unlike RDMAs, which typically involve trivially simple operations such as the retrieval of a single value from the memory of a remote machine, RDMOs may be arbitrarily complex. For example, an RDMO may cause a remote machine to compute the average of a set of numbers, where the numbers reside in the memory of the remote machine. The techniques described herein can help applications run without interruption when there are software faults or glitches on a remote system with which they interact.

Execution Candidates and Reliability Domains

According to one embodiment, within a single machine, multiple entities are provided for executing the same RDMO. The entities, within a given machine, that are capable of executing a particular RDMO are referred to herein as the "execution candidates" for the RDMO.

According to one embodiment, although in the same machine, the execution candidates for an RDMO belong to separate reliability domains. The "reliability domain" of an execution candidate generally refers to the software/hardware that must be functioning correctly on the machine for the execution candidate to perform the RDMO correctly. Two execution candidates belong to different reliability domains if one of the execution candidates is able to perform the RDMO correctly while a software and/or hardware error has rendered the other execution candidate unable to perform the RDMO correctly.

Because multiple execution candidates of an RDMO belong to different reliability domains, it is possible for one of the execution candidates to perform the RDMO during periods in which hardware/software errors within the machine prevent others of the execution candidates in the machine from performing the RDMO. The fact that multiple execution candidates are available for a particular RDMO increases the likelihood that the RDMO will succeed when requested by requesting entities that do not reside on the machine.

Increasing Availability of RDMOs

When a remote server is executing multiple execution candidates for a particular RDMO, and the execution candidates are from distinct reliability domains, the availability of the RDMO is increased. For example, in one embodiment, when a requesting entity requests the particular RDMO, an attempt is made to perform the particular RDMO using a first execution candidate on the machine. If the first execution candidate is unable to perform the RDMO, then an attempt is made to perform the particular RDMO using a second execution candidate on the machine. This process may continue until the particular RDMO succeeds, or all execution candidates have been tried.

In an alternative embodiment, when a requesting entity requests the particular RDMO, the particular RDMO may be attempted concurrently by two or more of the execution candidates. If any of the execution candidates succeeds, then it is reported to the requesting entity that the particular RDMO was successful.

In one embodiment, an execution candidate of an RDMO may be an entity that has been dynamically programmed to perform the RDMO. For example, a compute unit in a network interface controller of a machine may execute an interpreter. In response to determining that a particular RDMO should be performed in the network controller, rather than by an application running on the machine, data comprising instructions for performing the particular RDMO may be sent to the interpreter. In response to interpreting those instructions at the network controller, the particular RDMO may be performed even though the application itself may have crashed.

Reliability Domains

As mentioned above, the "reliability domain" of an execution candidate generally refers to the software/hardware that must be functioning correctly for the execution candidate to successfully perform an RDMO. FIG. 1 is a block diagram of a system that includes a machine 100 in which execution candidates of an RDMO reside at multiple distinct reliability domains. Specifically, a requesting entity 110 may request a particular RDMO by sending a request to machine 100 over network 112. Machine 100 includes a network interface controller 102 that has one or more compute units (represented as processing unit 104) that is executing firmware and/or software loaded into its local volatile memory 106.

Machine 100 includes a processor 120 that executes an operating system 132 and any number of applications, such as application 134. The code for the operating system 132 and application 134 may be stored on a persistent storage 136 and loaded into volatile memory 130 as needed. Processor 120 may be one of any number of processors within machine 100. Processor 120 may itself have many distinct compute units, shown as cores 122, 124, 126 and 128.

Processor 120 includes circuitry (illustrated as uncore 142) that allows entities executing in network interface controller 102 to access data 140 in the volatile memory 130 of machine 100 without involving cores 122, 124, 126 and 128.

In a remote server such as machine 100, entities capable of performing an RDMO requested by requesting entity 110 may reside in any number of reliability domains, including but not limited to any of the following:

- hardware within network interface controller 102
- an FPGA within network interface controller 102
- firmware stored in network interface controller 102
- software executed within network interface controller 102 by processing unit 104
- instructions in volatile memory 106 that are interpreted by an interpreter that is being executed within network interface controller 102 by processing unit 104
- an operating system 132, loaded into volatile memory 130 of machine 100, executed by one or more cores (122, 124, 126 and 128) of processor 120
- an application 134, loaded into volatile memory 130 of machine 100, executed by one or more cores (122, 124, 126 and 128) of processor 120
- software executing in a privileged domain (such as "dom0"). Privileged domains and dom0 are described, for example, at en.wikipedia.org/wiki/Xen.

This list of reliability domains is merely exemplary, and the techniques described herein are not limited to execution candidates from these reliability domains. The examples given above qualify as distinct reliability domains because entities within those domains fail under different conditions. For example, operating system 132 may continue to function normally even when application 134 has crashed or otherwise failed. Similarly, an execution candidate running within network interface controller 102 may continue to function normally even when all processes being executed by processor 120 (including operating system 132 and application 134) have crashed.

Further, since each core within processor 120 is a compute unit that may fail independently of the other compute units within processor 120, an execution candidate being executed by core 122 is in a different reliability domain than an execution candidate that is being executed by core 124.

Adding Support for New RDMOs

Machine 100 may include special purpose hardware, either in the network interface controller 102 or elsewhere, to implement a particular RDMO. However, hardware-implemented execution candidates cannot easily be extended to support additional RDMOs. Therefore, according to one embodiment, mechanisms are provided for adding support for additional RDMOs to other types of execution candidates. For example, assume that NIC 102 includes firmware for executing a particular set of RDMOs. Under these conditions, support for additional RDMOs may be added by conventional firmware update techniques to NIC 102.

On the other hand, if the execution candidate is implemented in an FPGA, support for new RDMOs can be added by reprogramming the FPGA. Such reprogramming may be performed, for example, by loading the FPGA with a revised FPGA bitstream at powerup.

Similarly, support for new RDMOs may be added to software-implemented execution candidates (e.g. software in NIC 102, operating system 132, and application 134) using conventional software update techniques. In an embodiment that involves executing an interpreter within NIC 102, new RDMOs can be supported by sending code which implements the new RDMOs to NIC 102. NIC 102 may store the code in volatile memory 106, and perform the new RDMOs by interpreting the code. For example, NIC 102 may be executing a Java Virtual Machine, and requesting entity 110 may cause the NIC 102 to perform a new RDMO (e.g. computing the average of a set of numbers) by sending Java byte-code to NIC 102 which, when interpreted by the Java Virtual Machine, causes the target set of numbers to be retrieved from volatile memory 130, and the average thereof to be computed.

Example RDMOs

In the foregoing discussion, examples are given where the RDMO in question is computing the average of a set of values. This is merely one example of an RDMO that can be supported by execution candidates from multiple distinct reliability domains. As mentioned above, RDMOs may be arbitrarily complex. However, the more complex the RDMO, the greater the resources that will be required to execute the RDMO efficiently, and the greater the likelihood that an execution candidate for the RDMO will encounter problems. In addition, complex RDMOs may execute slowly when performed by execution candidates from reliability domains with limited resources. For example, a complex RDMO that is normally performed by application 134 executed using all of the compute units of processor 120 will take significantly longer if executed by a relatively "lightweight" processing unit 104 on NIC 102.

Examples of RDMOs that may be supported by multiple execution candidates, from different reliability domains, within the same machine, include but are not limited to:

- setting a batch of flags, within the remote server machine, to indicate that corresponding portions of the remote server machine's volatile memory are unavailable or corrupt
- adjusting the state, within the remote server machine, to cause the remote server machine to respond to certain types of requests with error notifications. This may avoid the need to inform all other computing devices when the remote server machine is failing to handle certain requests properly.
- performing a batch of changes to a secondary replica of a data structure (stored in volatile and/or persistent memory at the remote server machine) to cause the secondary replica to reflect the changes made to a primary replica of the data structure (stored in volatile and/or persistent memory of another machine).
- any algorithm involving branching (e.g. logic configured to test one or more conditions and determine which way to branch (and therefore which actions to perform) based on the outcome of the test).
- any algorithm involving multiple reads of and/or multiple writes to, the volatile memory of the remote server. Because each read and/or write does not involve an RDMA communication between machines, executing multiple reads and/or writes in response to a single RDMO request significantly reduces inter-machine communication overhead.
- reading data from/writing data to a persistent storage device (e.g. storage 136) that is operatively coupled to the remote server machine. The ability to do this using an execution candidate in the NIC 102 is particularly useful when the persistent storage is not directly accessible to the requesting entity, so that data on persistent storage 136 remains available to the requesting entity even when software running on the compute units of the remote machine (e.g. cores 122, 124, 126 and 128), potentially including the operating system 132 itself, may have crashed.

Fallback Execution Candidates

As mentioned above, availability of an RDMO may be increased by having an RDMO execution candidate from one reliability domain serve as a fallback for an RDMO execution candidate from another reliability domain. The choice of which execution candidate is the primary candidate for the RDMO and which is the fallback candidate, may vary based on the characteristics of the candidates and the nature of the RDMO.

For example, in the case where the RDMO is for a relatively simple operation, it is possible that the operation may be performed more efficiently by an execution candidate running in NIC 102 than an application 134 running on processor 120. Thus, for that particular RDMO, it may be desirable to have the execution candidate running in NIC 102 to be the primary execution candidate for the RDMO, and application 134 be the fallback execution candidate. On the other hand, if the RDMO is relatively complex, it may be more efficient for application 134 to be used as the primary execution candidate for the RDMO, while an execution candidate on NIC 102 serves as the fallback execution candidate.

Figure 2:
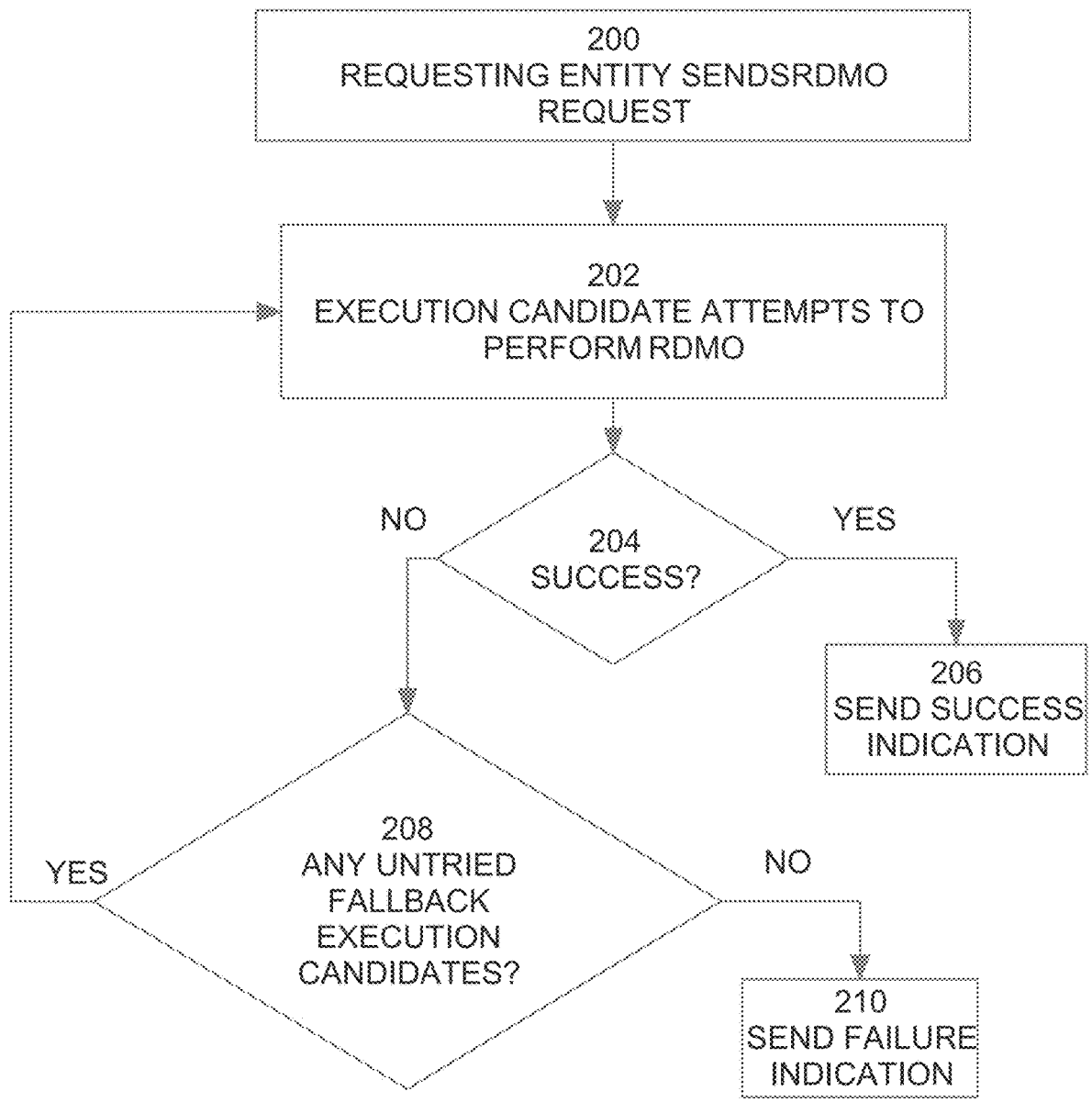
FIG. 2 is a flowchart illustrating use of fallback execution candidates, according to an embodiment.

FIG. 2 is a flowchart illustrating use of fallback execution candidates, according to an embodiment. At step 200, a requesting entity sends a request for an RDMO over a network to a remote computing device. At step 202, a first execution candidate at the remote computing device attempts to perform the RDMO. If the RDMO is successfully performed (determined at step 204), a response indicating the success (possibly containing additional result data) is sent back to the requesting entity at step 206. Otherwise, it is determined at step 208 whether another execution candidate, which has not yet been tried, is available for executing the RDMO. If no other execution candidate is available for the RDMO, then an error indication is sent back to the requesting entity at step 210. Otherwise, an attempt is made to perform the RDMO using another execution candidate.

This process may be continued until the RDMO is successfully performed, or all execution candidates for the RDMO have failed. In one embodiment, an entity at the remote server is responsible for iterating through the execution candidates. In such an embodiment, attempts to perform the RDMO using the fallback execution candidates are made without informing the requesting entity of any failures until all possible execution candidates for the RDMO have failed. This embodiment reduces that amount of inter-machine message traffic generated during the iteration process.

In an alternative embodiment, the requesting entity is informed each time an execution candidate fails to perform the RDMO. In response to a failure indication, the requesting entity determines which execution candidate to try next, if any. In response to determining that a particular execution candidate should be tried next, the requesting entity sends another request to the remote computing device. The new request indicates the fallback execution candidate that should then attempt to perform the RDMO.

It should be noted that failure of an execution candidate may be implicitly indicated, rather than explicitly indicated. For example, it may be assumed that an execution candidate has failed if, for example, the execution candidate has not acknowledged success after a particular amount of time has elapsed. In such cases, the requesting entity may issue a request that the RDMO be performed by another execution candidate before receiving any explicit indication that a previously-selected execution candidate has failed.

The actual execution candidates that attempt to perform any given RDMO, as well as the sequence in which the execution candidates make the attempts, may vary based on a variety of factors. In one embodiment, the execution candidates are tried in an order that is based on their likelihood of failure, where an application running on the remote computing device (which may be the candidate most likely to crash) is tried first (because it has more resources available), and a hardware-implemented candidate in the NIC (which may be the candidate least likely to crash) is tried last (because it has the least resources available).

As another example, in situations where it appears that the processors of the remote computing device are overloaded or crashed, the requesting entity may first request that the RDMO be performed by an entity implemented in the network interface controller of the remote computing device. On the other hand, if there is no such indication, the requesting entity may first request that the RDMO be performed by an application, running on the remote machine, that can take full advantage of the computational hardware available thereon.

As another example, for relatively simple RDMOs, the requesting device may first request that the RDMOs be performed by relatively "light-weight" execution candidates implemented in the network interface controller. On the other hand, requests for relatively complex RDMOs may first be sent to applications on the remote computing device, and only sent to light-weight execution candidates when the applications fail to perform the RDMOs.

Parallel Execution Candidates

As also mentioned above, availability of an RDMO may be increased by having multiple execution candidates, from different reliability domains, attempt to perform the RDMO in parallel. For example, assume that the RDMO is to determine the average of a set of numbers. In response to a single request from requesting entity 110, an execution candidate implemented in NIC 102 and application 134 may both be invoked to perform the RDMO. In this example, both application 134 and the execution candidate in NIC 102 would read the same set of values (e.g. data 140) from volatile memory 130, count the numbers in the set, sum the numbers in the set, and then divide the sum by the count to obtain the average. If neither execution candidate fails, then both execution candidates may provide their response to requesting entity 110, which may simply discard the duplicate response.

In the case where one execution candidate fails and one succeeds, the execution candidate that does not fail returns the response to requesting entity 110. Thus, the RDMO completes successfully despite the fact that something within machine 100 is not functioning correctly.

In the case where all execution candidates that initially attempted the RDMO fail, a second set of execution candidates, from different reliability domains than the first set of execution candidates, may try to execute the RDMO in parallel. In the case that at least one of the fallback execution candidate succeeds, the RDMO succeeds. This process may proceed until one of the execution candidates for the RDMO succeeds, or all execution candidates for the RDMO fail.

Rather than have all successful execution candidates return responses to requesting entity 100, some "coordinating entity" within machine 100 may invoke a set of execution candidates to perform the RDMO in parallel. If multiple candidates succeed, the successful candidates may provide responses back to the coordinating entity which then returns a single response to requesting entity 110. This technique simplifies the logic of the requesting entity 110, making transparent to requesting entity 110 how many execution candidates on machine 100 were asked to perform the RDMO, and which of those execution candidates succeeded.

Figure 3:
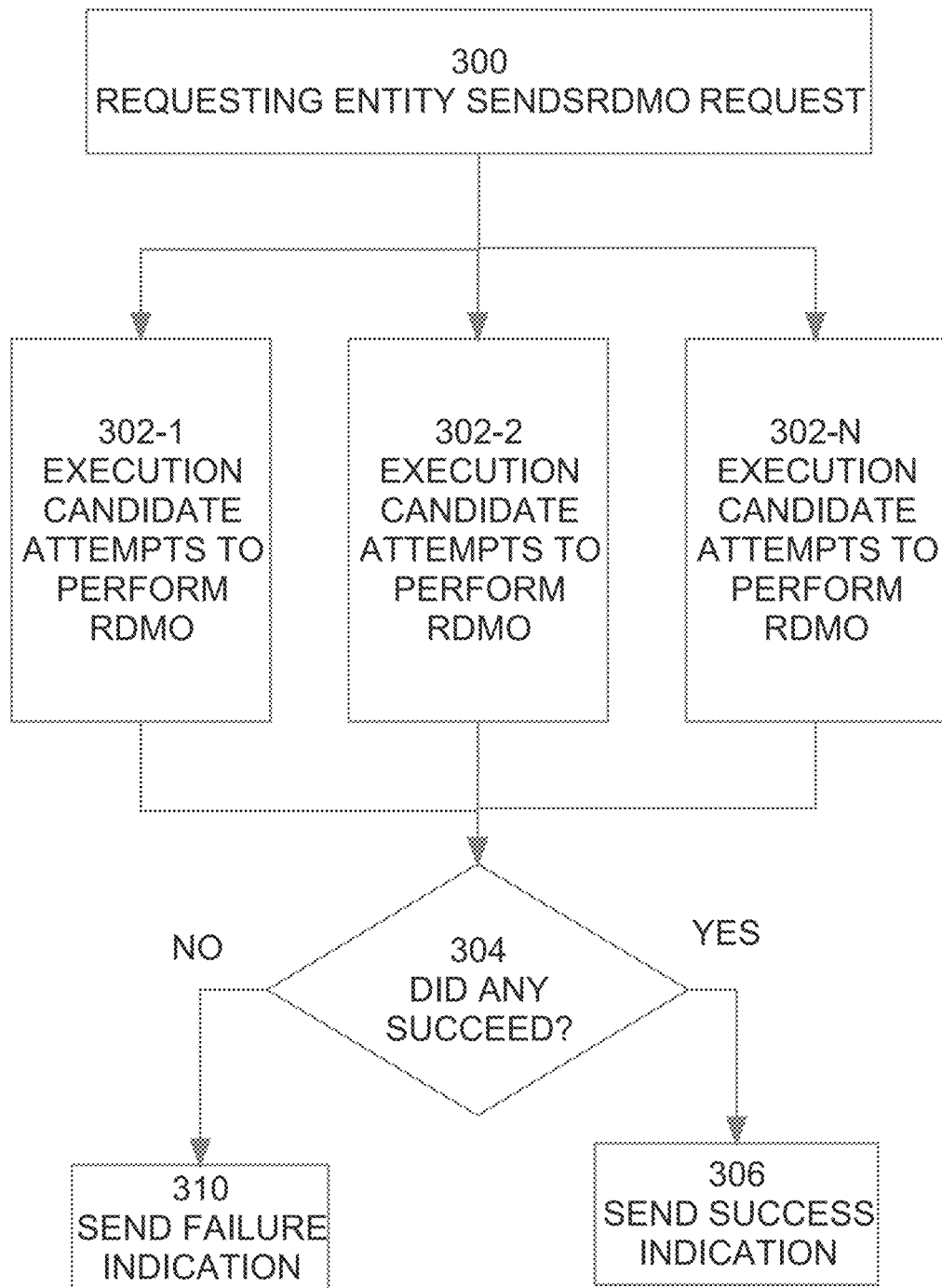
FIG. 3 is a flowchart illustrating use of parallel execution candidates, according to an embodiment.

FIG. 3 is a flowchart illustrating use of parallel execution candidates, according to an embodiment. Referring to FIG. 3, at step 300, a requesting entity sends a request for an RDMO to a remote computing device. At steps 302-1 through 302-N, each of N execution candidates for the RDMO concurrently attempts to perform the RDMO. At step 304, if any of the execution candidates succeeds, control passes to step 306 at which an indication of success (which may include additional results data) is sent to the requesting entity. Otherwise, if all fail, an indication of failure is sent to the requesting entity at step 310.

Interpreter as a Nic-Based Execution Candidate

As mentioned above, one form of execution candidate for an RDMO is an interpreter. For an interpreter to serve as an execution candidate for and RDMO, the interpreter is provided code which, when interpreted, executes the operations required by the RDMO. Such an interpreter may be executed, for example, by the processing unit 104 within NIC 102, by processor 120, or by a subset of the cores of processor 120.

According to one embodiment, the code for a particular RDMO is registered with the interpreter. Once registered, requesting entities may invoke the code (e.g. through an remote procedure call), causing the code to be interpreted by the interpreter. In one embodiment, the interpreter is a Java Virtual Machine, and the code is Java byte-code. However, the techniques used herein are not limited to any particular type of interpreter or code. While an RDMO that is performed by an interpreter within NIC 102 is likely to take much longer than the same RDMO performed by a compiled application (e.g. application 134) executing on processor 120, the interpreter within NIC 102 may be operational in periods during which some error prevents the operation of the compiled application.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
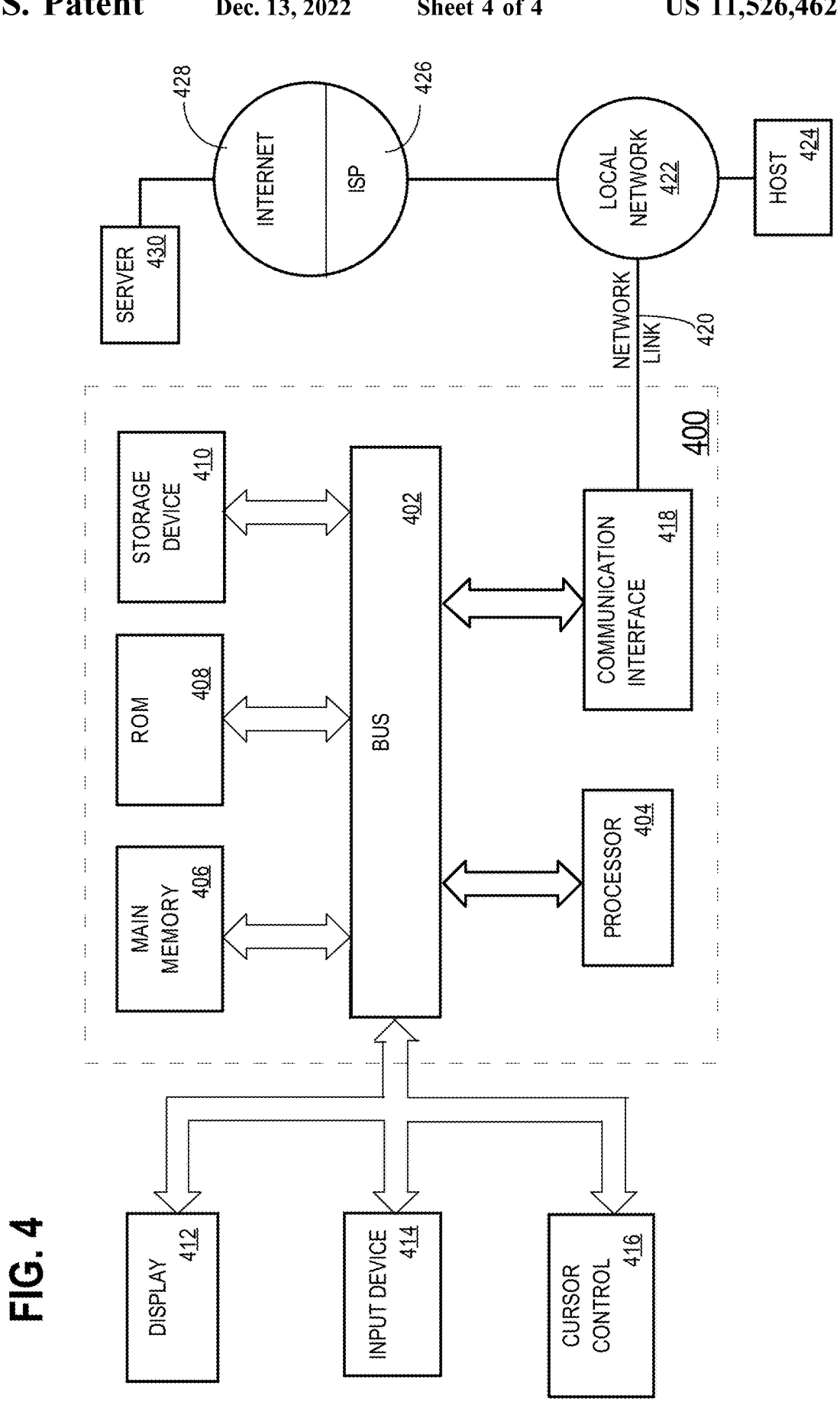
FIG. 4 is a block diagram of a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of attempting performance of an operation on a particular computing device, comprising:
concurrently executing, on the particular computing device that contains local volatile memory:
a first execution candidate, implemented in a first reliability domain on the particular computing device, capable of performing the operation,
a second execution candidate, implemented in a second reliability domain on the particular computing device, capable of performing the operation, and
a third execution candidate, implemented in a third reliability domain on the particular computing device, capable of performing the operation;
wherein the first, second and third reliability domains are distinct from each other;
wherein the operation requires access to data in the local volatile memory associated with the particular computing device;
based on one or more factors, selecting a target execution candidate, from among the first, second and third execution candidates; and
attempting performance of the operation using the target execution candidate.

2. The method of claim 1, further comprising:
receiving a request to perform the operation, from a requesting entity executing on a second computing device that is remote relative to the particular computing device;
wherein said attempting performance of the operation using the target execution candidate is performed in response to receiving the request to perform the operation from the requesting entity.

3. The method of claim 1, wherein said selecting the target execution candidate is performed by a requesting entity executing on a second computing device that is remote relative to the particular computing device.

4. The method of claim 1, wherein said selecting the target execution candidate is performed at the particular computing device.

5. The method of claim 1, wherein the target execution candidate is one of:
an application running on one or more processors of the particular computing device;
implemented in a network interface controller of the particular computing device;

implemented within an operating system executing on the particular computing device;

implemented within a privileged domain on the particular computing device;

executed on a first set of one or more cores of a processor in the particular computing device;

executed on a second set of one or more cores of the processor, wherein membership of the second set of one or more cores is different than membership of the first set of one or more cores; or an interpreter that interprets instructions that, when interpreted, cause performance of the operation.

6. The method of claim 5, wherein:

the target execution candidate is an interpreter that interprets instructions that, when interpreted, cause performance of the operation;

the interpreter is implemented on a network interface controller through which the particular computing device communicates over a network;

wherein the target execution candidate performs the operation by interpreting instructions specified in data provided to the network interface controller.

7. A method of attempting performance of an operation on a particular computing device, comprising:

concurrently executing, on the particular computing device that contains local volatile memory:

a first execution candidate, implemented in a first reliability domain on the particular computing device, capable of performing the operation, and a second execution candidate, implemented in a second reliability domain on the particular computing device, capable of performing the operation;

wherein the first reliability domain includes a first set of one or more cores of a processor of the particular computing device;

wherein the second reliability domain includes a second set of one or more cores of the processor of the particular computing device;

wherein the first set of one or more cores is different than the second set of one or more cores;

wherein the operation requires access to data in the local volatile memory of the particular computing device;

selecting a target execution candidate, from among the first and second execution candidates; and causing the target execution candidate to perform the operation.

8. The method of claim 7 wherein:

the first execution candidate supports a first set of operations;

the second execution candidate supports a second set of operations; and the second set of operations is a proper subset of the first set of operations.

9. The method of claim 7, further comprising:

receiving a request to perform the operation, from a requesting entity executing on a second computing device that is remote relative to the particular computing device;

wherein said attempting performance of the operation using the target execution candidate is performed in response to receiving the request to perform the operation from the requesting entity.

10. One or more non-transitory computer-readable media storing one or more sequences of instructions for attempting performance of an operation on a particular computing device, the one or more sequences of instructions comprising instructions that, when executed by one or more processors, cause:

concurrently executing, on the particular computing device that contains local volatile memory:

a first execution candidate, implemented in a first reliability domain on the particular computing device, capable of performing the operation, a second execution candidate, implemented in a second reliability domain on the particular computing device, capable of performing the operation, and a third execution candidate, implemented in a third reliability domain on the particular computing device, capable of performing the operation;

wherein the first, second and third reliability domains are distinct from each other;

wherein the operation requires access to data in the local volatile memory associated with the particular computing device;

based on one or more factors, selecting a target execution candidate, from among the first, second and third execution candidates; and attempting performance of the operation using the target execution candidate.

11. The one or more non-transitory computer-readable media of claim 10, wherein the one or more sequences of instructions further comprise instructions that, when executed by one or more processors, cause:

receiving a request to perform the operation, from a requesting entity executing on a second computing device that is remote relative to the particular computing device;

wherein said attempting performance of the operation using the target execution candidate is performed in response to receiving the request to perform the operation from the requesting entity.

12. The one or more non-transitory computer-readable media of claim 10, wherein said selecting the target execution candidate is performed by a requesting entity executing on a second computing device that is remote relative to the particular computing device.

13. The one or more non-transitory computer-readable media of claim 10, wherein said selecting the target execution candidate is performed at the particular computing device.

14. The one or more non-transitory computer-readable media of claim 10, wherein the target execution candidate is one of:

an application running on one or more processors of the particular computing device;

implemented in a network interface controller of the particular computing device;

implemented within an operating system executing on the particular computing device;

implemented within a privileged domain on the particular computing device;

executed on a first set of one or more cores of a processor in the particular computing device;

executed on a second set of one or more cores of the processor, wherein membership of the second set of one or more cores is different than membership of the first set of one or more cores; or an interpreter that interprets one or more instructions that, when interpreted, cause performance of the operation.

15. The one or more non-transitory computer-readable media of claim 14, wherein:

the target execution candidate is an interpreter that interprets one or more instructions that, when interpreted, cause performance of the operation;

the interpreter is implemented on a network interface controller through which the particular computing device communicates over a network;

wherein the target execution candidate performs the operation by interpreting one or more instructions specified in data provided to the network interface controller.

16. One or more non-transitory computer-readable media storing one or more sequences of instructions for attempting performance of an operation on a particular computing device, the one or more sequences of instructions comprising instructions that, when executed by one or more processors, cause:

concurrently executing, on the particular computing device that contains local volatile memory:
- a first execution candidate, implemented in a first reliability domain on the particular computing device, capable of performing the operation, and
- a second execution candidate, implemented in a second reliability domain on the particular computing device, capable of performing the operation;

wherein the first reliability domain includes a first set of one or more cores of a processor of the particular computing device;

wherein the second reliability domain includes a second set of one or more cores of the processor of the particular computing device;

wherein the first set of one or more cores is different than the second set of one or more cores;

wherein the operation requires access to data in the local volatile memory of the particular computing device;

selecting a target execution candidate, from among the first and second execution candidates; and causing the target execution candidate to perform the operation.

17. The one or more non-transitory computer-readable media of claim 16 wherein:

the first execution candidate supports a first set of operations;

the second execution candidate supports a second set of operations; and the second set of operations is a proper subset of the first set of operations.

18. The one or more non-transitory computer-readable media of claim 16, wherein the one or more sequences of instructions further comprise instructions that, when executed by one or more processors, cause:

receiving a request to perform the operation, from a requesting entity executing on a second computing device that is remote relative to the particular computing device;

wherein said attempting performance of the operation using the target execution candidate is performed in response to receiving the request to perform the operation from the requesting entity.

\* \* \* \* \*